United States Patent
Lee et al.

(10) Patent No.: US 11,065,995 B2
(45) Date of Patent: Jul. 20, 2021

(54) PUMPING DEVICE FOR SEAT OF VEHICLE

(71) Applicant: HYUNDAI TRANSYS INCORPORATED, Seosan-si (KR)

(72) Inventors: Young Sun Lee, Seoul (KR); Won Kim, Suwon-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/881,725

(22) Filed: May 22, 2020

(65) Prior Publication Data
US 2020/0391639 A1 Dec. 17, 2020

(30) Foreign Application Priority Data
Jun. 13, 2019 (KR) ........................ 10-2019-0070058

(51) Int. Cl.
*B60N 2/90* (2018.01)
*B60N 2/16* (2006.01)

(52) U.S. Cl.
CPC ............. *B60N 2/938* (2018.02); *B60N 2/168* (2013.01); *B60N 2/1635* (2013.01)

(58) Field of Classification Search
CPC ...... B60N 2/1635; B60N 2/165; B60N 2/168; B60N 2/938
See application file for complete search history.

(56) References Cited

U.S. PATENT DOCUMENTS

| | | | | |
|---|---|---|---|---|
| 6,481,557 B2* | 11/2002 | Denis | ..................... | B60N 2/167 192/15 |
| 8,348,344 B2* | 1/2013 | Richard | ................. | B60N 2/167 297/344.12 |
| 8,496,098 B1* | 7/2013 | Napau | .................... | B60N 2/168 192/15 |
| 8,672,408 B2* | 3/2014 | Legras | ................. | B60N 2/2255 297/362 |
| 9,205,765 B2* | 12/2015 | Kim | ..................... | B60N 2/2252 |
| 9,216,667 B1* | 12/2015 | Izawa | .................. | B60N 2/6009 |
| 9,541,147 B2* | 1/2017 | Isoda | ...................... | F16D 41/18 |
| 10,703,229 B2* | 7/2020 | Kim | ..................... | B60N 2/168 |
| 2001/0050505 A1* | 12/2001 | Teufel | .................. | B60N 2/2252 297/362 |
| 2003/0061899 A1* | 4/2003 | Liu | ........................ | B60N 2/938 74/575 |
| 2003/0062749 A1* | 4/2003 | Liu | ........................ | B60N 2/943 297/284.4 |
| 2003/0085099 A1* | 5/2003 | Liu | ......................... | G05G 5/06 192/223.2 |

(Continued)

FOREIGN PATENT DOCUMENTS

KR 10-0722849 B1 5/2007
KR 10-0755651 B1 9/2007
(Continued)

*Primary Examiner* — James M Ference
(74) *Attorney, Agent, or Firm* — Novick, Kim & Lee, PLLC; Jae Youn Kim (57) ABSTRACT

A pumping device for a seat of a vehicle, in which a cam supporter supports a clutch cam to be balanced in the pumping device, thereby minimizing movement of the clutch cam due to an external force reversely input, and the cam supporter guides movements of brake rollers, thereby causing braking operation by the brake rollers to be precisely performed and improving operating performance.

9 Claims, 9 Drawing Sheets

(56) References Cited

U.S. PATENT DOCUMENTS

| | | | | |
|---|---|---|---|---|
| 2003/0173182 A1* | 9/2003 | Kim | B60N 2/168 | 192/223.2 |
| 2004/0099498 A1* | 5/2004 | Kurita | B60N 2/168 | 192/12 B |
| 2004/0174061 A1* | 9/2004 | Scheck | B60N 2/938 | 297/374 |
| 2005/0006193 A1* | 1/2005 | Kim | B60N 2/168 | 192/15 |
| 2009/0127910 A1* | 5/2009 | Stilleke | B60N 2/938 | 297/362 |
| 2009/0184554 A1* | 7/2009 | Paing | B60N 2/168 | 297/358 |
| 2009/0272613 A1* | 11/2009 | Kawai | B60N 2/165 | 192/45.01 |
| 2009/0273218 A1* | 11/2009 | Park | B60N 2/167 | 297/284.6 |
| 2011/0266851 A1* | 11/2011 | Kim | B60N 2/167 | 297/344.12 |
| 2012/0273319 A1* | 11/2012 | Hur | B60N 2/167 | 192/15 |
| 2015/0158398 A1* | 6/2015 | Kim | B60N 2/938 | 297/344.12 |
| 2015/0314708 A1* | 11/2015 | Kim | B60N 2/168 | 297/344.12 |
| 2015/0314709 A1* | 11/2015 | Kim | B60N 2/1864 | 297/344.12 |
| 2015/0367755 A1* | 12/2015 | Lee | B60N 2/1685 | 297/344.12 |
| 2017/0096083 A1* | 4/2017 | Lee | B60N 2/167 | |
| 2017/0253148 A1* | 9/2017 | Chae | B60N 2/169 | |
| 2017/0253149 A1* | 9/2017 | Chae | B60N 2/168 | |
| 2018/0001794 A1* | 1/2018 | Kim | B60N 2/1635 | |
| 2018/0094679 A1* | 4/2018 | Kaku | F16D 51/12 | |
| 2019/0152347 A1* | 5/2019 | Becker | F16H 57/032 | |
| 2019/0193596 A1* | 6/2019 | Chae | B60N 2/165 | |
| 2019/0193597 A1* | 6/2019 | Chang | F16D 41/066 | |
| 2020/0391639 A1* | 12/2020 | Lee | B60N 2/168 | |

FOREIGN PATENT DOCUMENTS

| | | |
|---|---|---|
| KR | 10-0789641 B1 | 12/2007 |
| KR | 10-2008-0028088 A | 3/2008 |
| KR | 10-2014-0085059 A | 7/2014 |

* cited by examiner

PUMPING DEVICE FOR SEAT OF VEHICLE

CROSS REFERENCE TO RELATED APPLICATION

The present application claims priority to Korean Patent Application No. 10-2019-0070058, filed Jun. 13, 2019, the entire contents of which is incorporated herein for all purposes by this reference.

BACKGROUND OF THE INVENTION

Field of the Invention

The present disclosure relates generally to a pumping device for a seat of a vehicle and, more particularly, to a pumping device for a seat of a vehicle, the pumping device being configured to improve rigidities of internal components and to have operational stability.

Description of the Related Art

Generally, seats such as a driver's seat and passenger seats provided in the front and back areas of a cabin of a vehicle are provided with various convenience devices for passenger comfort.

As the convenience devices, a seat of a vehicle has functions such as a sliding function that can adjust a position of a seat by pushing and pulling forward and backward the seat according to a body shape of a passenger, and a reclining function that can adjust inclination of a seat back.

Further, in recent years, a pumping device, which has a seat lifting function, has been provided in a vehicle to adjust the height of the seat to fit to the height of a passenger.

The pumping device can include a lever unit, a clutch unit, and a brake unit. The lever unit receives a user's operating force and transmits the operating force to the clutch unit, the clutch unit transmits the input operating force to a link means of a seat, and the brake unit blocks a reversely input power to fix the locked link means.

The lever unit includes a lever bracket, which converts a vertical operating force of a handle lever provided at a side of a seat into a rotational force and transmits the rotational force to the clutch unit. Further, the pumping device may include a return part for returning the handle lever and the lever bracket to initial positions.

Specifically, the clutch unit may have problems in that, as a clutch cam constituting the clutch unit is tilted by a reversely input power, imbalance between internal components occurs, thereby increasing operating force or causing durability degradation and noise.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a pumping device for a seat of a vehicle, the pumping device being configured such that internal components of the pumping device are maintained in a balanced state, thereby securing operating performance and durability performance of the pumping device.

In order to achieve the above objectives, according to one aspect of the present disclosure, there is provided a pumping device for a seat of a vehicle, the pumping device including: a lever bracket configured to rotate by an external operating force; a clutch device housing a clutch cam that may be coupled to the lever bracket and rotating in conjunction with rotation of the clutch cam; a brake device configured to rotate in conjunction with the clutch device, coupled with an output shaft, wherein the brake device may be configured to rotate by a rotational force input through the clutch device, but not rotate by a rotational force input through the output shaft; and a cam supporter provided between the clutch device and the brake device, wherein when the output shaft rotates eccentrically, the cam supporter with a first side facing the clutch cam and a second side supported by the brake device may be brought into contact with the clutch cam to restrict movement of the clutch cam.

The brake device may include: a brake drum integrally coupled with the output shaft and having a plurality of supporting protrusions that may protrude along an outer circumferential surface thereof; and a plurality of brake rollers that may be respectively arranged at both sides of each of the supporting protrusions, thus forming an arrangement in which the brake rollers may be spaced apart from each other between supporting protrusions adjacent to each other.

The cam supporter may be provided with a plurality of support protrusions on an outer circumference thereof, and the plurality of support protrusions of the cam supporter may correspond to the plurality of brake rollers that may be seated on the brake drum.

The support protrusions of the cam supporter may be bent toward the supporting protrusions of the brake drum and surround the supporting protrusions, and the support protrusions may have shapes corresponding to figures of the supporting protrusions that may be respectively arranged between the brake rollers.

The cam supporter may have a central axis that may be concentric with a rotational shaft of the clutch cam, and have a central portion protruding toward the clutch cam.

The cam supporter may have a through hole at the center of the central portion, the through hole being open in an axial direction of the cam supporter, so that a remaining portion of the central portion excluding the through hole may have a shape protruding toward the clutch cam.

At the central portion of the cam supporter, the cam supporter may have a plurality of protrusions that may be arranged to be spaced apart from each other in a circumferential direction of the central portion around the center thereof and cut and protrude toward the clutch cam.

At a central portion of the cam supporter, the cam supporter may have an open hole that may be open with a diameter smaller than or equal to a diameter of the clutch cam, and the open hole may have a contact portion extending in a radial inward direction thereof and being bent toward the clutch cam.

The clutch device may include: the clutch cam coupled to the lever bracket, thus rotating together with the lever bracket, and having a plurality of wedge protrusions at an outer circumferential surface thereof; clutch rollers provided on the outer circumferential surface of the clutch cam and respectively arranged at both sides of each wedge protrusion; a clutch spring connected to the clutch rollers arranged between the wedge protrusions adjacent to each other so as to elastically support the clutch rollers in a circumferential direction of the clutch cam; and a clutch drum provided with the clutch rollers and the clutch spring at an inner circumferential surface thereof, and having an insert protrusion that may extend toward the brake drum in an axial direction of the clutch cam and be inserted between the brake rollers arranged between the supporting protrusions adjacent to each other.

According to the embodiment of the present disclosure, the pumping device for a seat of a vehicle is advantageous in that the cam supporter supports the clutch cam to be balanced in the pumping device, thereby minimizing movement of the clutch cam due to a reversely input power. In addition, the cam supporter guides movement of the brake rollers, so that braking operation performed by the brake rollers is performed precisely, thereby improving the operating performance.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinbelow, a pumping device for a seat of a vehicle according to exemplary embodiments of the present disclosure will be described with reference to the accompanying drawings.

Figure 1:
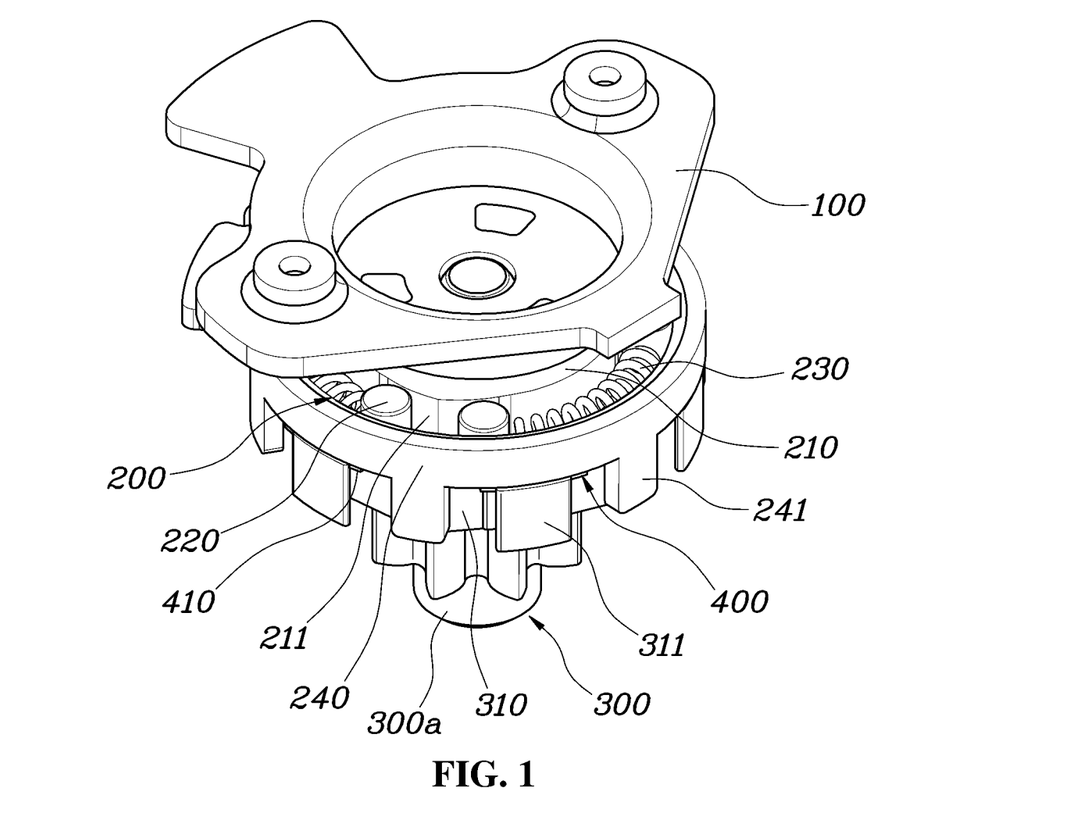
FIG. 1 is a view showing a pumping device for a seat of a vehicle according to an embodiment of the present disclosure.

FIG. 1 is a view showing a pumping device for a seat of a vehicle according to an embodiment of the present disclosure, FIGS. 2 to 6 are views showing the pumping device for a seat of a vehicle in FIG. 1, and FIGS. 7 to 11 are views showing various embodiments of a cam supporter according to the present disclosure.

Figure 2:
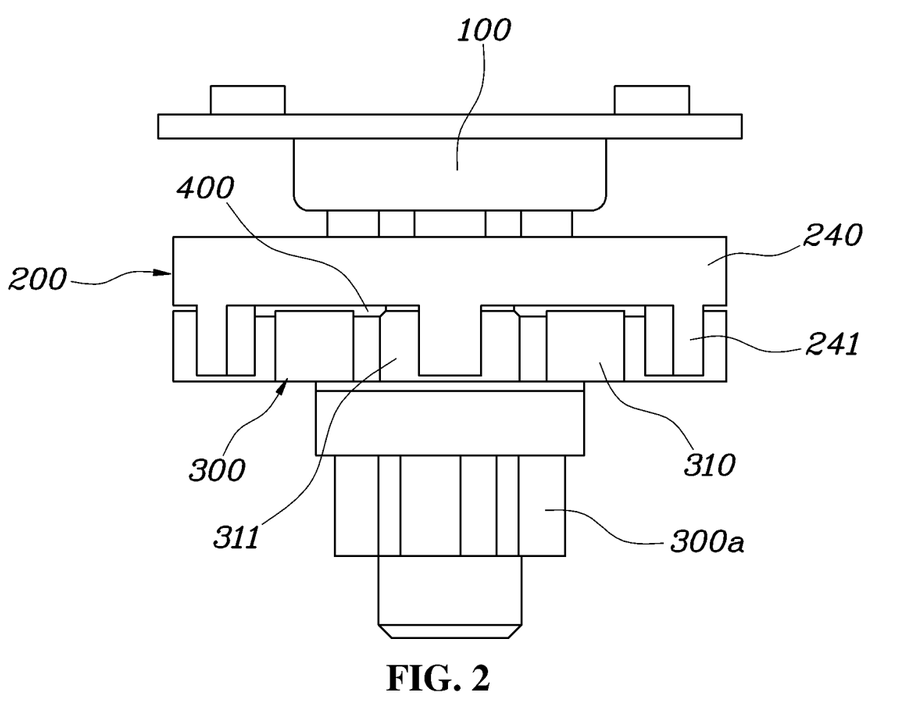
FIGS. 2 to 6 are views showing the pumping device for a seat of a vehicle in FIG. 1.
Figure 3:
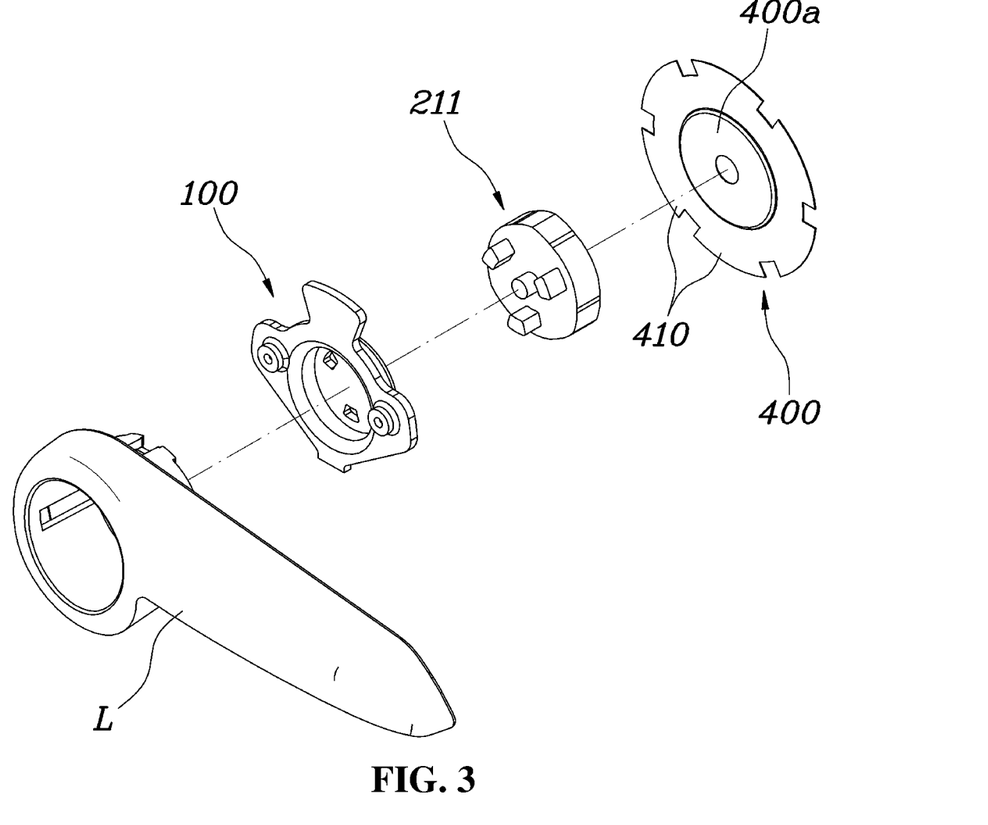

As shown in FIGS. 1 to 3, the pumping device for a seat of a vehicle according to the present disclosure includes: a lever bracket 100 configured to rotate by an external operating force; a clutch device 200 housing a clutch cam 210 coupled to the lever bracket 100 and rotating in conjunction with rotation of the clutch cam 210; a brake device 300 configured to rotate in conjunction with the clutch device, integrally coupled with an output shaft 300a, and configured to rotate by a rotational force input through the clutch device, but not rotate by a rotational force input through the output shaft 300a; and a cam supporter 400 provided between the clutch device 200 and the brake device 300, the cam supporter 400 with a first side thereof facing the clutch cam 210 and a second side thereof being supported by the brake device 300 being brought into contact with the clutch cam 210 to restrict movement of the clutch cam 210, when the output shaft 300a rotates eccentrically. Further, a housing may be provided to house the lever bracket 100, the clutch device 200, and the brake device 300.

As described above, the present disclosure includes the lever bracket 100, the clutch device 200, the brake device 300, and the cam supporter 400. The lever bracket 100 is integrally coupled with a lever handle L manipulated by a user, is built into the clutch device 200, and is coupled with the clutch cam 210 to rotate with the clutch cam 210.

The clutch device 200 includes: the clutch cam 210 coupled to the lever bracket 100, thus rotating with the lever bracket 100, and having a plurality of wedge protrusions 211 at an outer circumferential surface thereof; clutch rollers 220 provided on the outer circumferential surface of the clutch cam 210 and respectively arranged at both sides of each of the wedge protrusions 211; a clutch spring 230 connected to the clutch rollers 220 arranged between the wedge protrusions 211 adjacent to each other so as to elastically support the clutch rollers 220 in a circumferential direction of the clutch cam 210; and a clutch drum 240 provided with the clutch rollers 220 and the clutch spring 230 at an inner circumferential surface thereof and having insert protrusions 241, which each extends toward a brake drum 310 in an axial direction thereof and is inserted between brake rollers 320 arranged between supporting protrusions 311 adjacent to each other. The lever handle L and the lever bracket 100 may be integrally coupled to each other by bolting, and the lever bracket 100 and the clutch cam 210 may be coupled to each other by a prominence and depression structure to rotate together. The clutch device 200 serves to provide an elastic restoring force of the lever bracket 100 and to transmit an operating force generated by rotation of the lever bracket 100 to a seat.

The brake device 300 may include: the brake drum 310 integrally coupled with the output shaft 300a and having a plurality of supporting protrusions 311 which protrude along an outer circumferential surface thereof; and a plurality of brake rollers 320 respectively arranged at both sides of each of the supporting protrusions 311, thereby forming an arrangement in which the brake rollers 320 are spaced apart from each other between the supporting protrusions 311 adjacent to each other. The brake device 300 serves to block torque reversely input through the output shaft 300a and to maintain adjusted the height of a seat of a vehicle.

As described above, the clutch device 200 and the brake device 300 are connected to each other to be moved in conjunction with each other. Hereinafter, operation of the pumping device according to an embodiment will be described.

When the lever handle L is manipulated for adjusting the height of the seat by the pumping device, the clutch cam 210 of the clutch device 200 connected to the lever handle L rotates. When the clutch cam 210 rotates, centering on the wedge protrusions 211 of the clutch cam 210, the clutch rollers 220 are pressed between the wedge protrusions 211 and the clutch drum 240. This causes each of the clutch rollers 220 to act as a wedge between the clutch drum 240 and the clutch cam 210, so that the clutch drum 240 rotates with the clutch cam 210.

Simultaneously, as the clutch roller 220 rotates, the clutch spring 230 is pressed, and another clutch roller 220 connected to the clutch spring 230 also rotates together and acts as a wedge between the clutch drum 240 and the clutch cam 210. After that, when the lever handle L is released, the clutch rollers 220 may be returned to initial positions by an elastic restoring force of the clutch spring 230.

When the clutch drum 240 rotates, the insert protrusions 241 provided on the clutch drum 240 push the brake rollers 320, so that the brake drum 310 rotates. In detail, the supporting protrusions 311 are provided on an outer circumferential surface of the brake drum 310, the brake rollers 320 are arranged at both sides of each of the supporting protrusions 311, and wedge surfaces 312 are provided between the brake rollers 320 adjacent to each other. Whereby, when the brake rollers 320 are pushed by the insert protrusions 241 and moved, the brake rollers 320 contact with the wedge surfaces 312, so that the brake drum 310 may rotate.

In other words, when the clutch drum 240 rotates by rotation of the clutch cam 210 with the insert protrusions 241 of the clutch drum 240 inserted between the brake rollers 320, the insert protrusions 241 push the brake rollers 320, so that the brake rollers are connected to the brake drum 310 in a fitted manner to allow the brake drum 310 to rotate with the clutch drum 240. When the brake drum 310 rotates with the clutch drum 240, the output shaft 300a coupled to the brake drum 310 rotates with the brake drum 310, so that the height of the seat may be adjusted through a link means. The link means is a common technique in a seat device where the pumping device is applied, and a description of linking structure of the link means will be omitted.

When adjusting of the height of the seat is finished, as the brake rollers 320 positioned at the wedge surfaces 312 of the brake drum 310 remain in a fitted state in the wedge surfaces 312, even when an external force is reversely input through the output shaft 300a, rotation of the brake drum 310 is prevented. That is, even when an external force reversely input through the output shaft 300a acts on the pumping device in addition to the operating force through the lever bracket 100 and the clutch device 200 generated by the manipulation of the lever handle L, a position of the seat may be maintained by a braking function of the brake drum 310.

The above-described pumping device of the present disclosure is configured such that the cam supporter 400 is provided between the clutch device 200 and the brake device 300.

In other words, the pumping device should be configured such that configurations of the lever bracket 100, the clutch device 200, and the brake device 300 rotate with concentric axes, but there is problem in that the output shaft 300a rotates eccentrically by an external force applied through the output shaft 300a, thereby causing imbalance to axis balance between components of the clutch device 200 and the brake device 300. Accordingly, the pumping device of the present disclosure is provided with the cam supporter 400 between the clutch device 200 and the brake device 300, and the cam supporter 400 with the first side facing the clutch cam 210 and the second side supported by the brake device 300 is configured to restrict the movement of the clutch cam 210 in an axial direction, when the output shaft 300a rotates eccentrically. That is, when the output shaft 300a rotates eccentrically, the cam supporter 400 is pushed and moved and then is brought into contact with the clutch cam 210, thereby restricting the movement of the clutch cam 210. Thus, the clutch cam 210 and the brake drum 310 remain parallel, thereby maintaining balance between the components.

Figure 4:
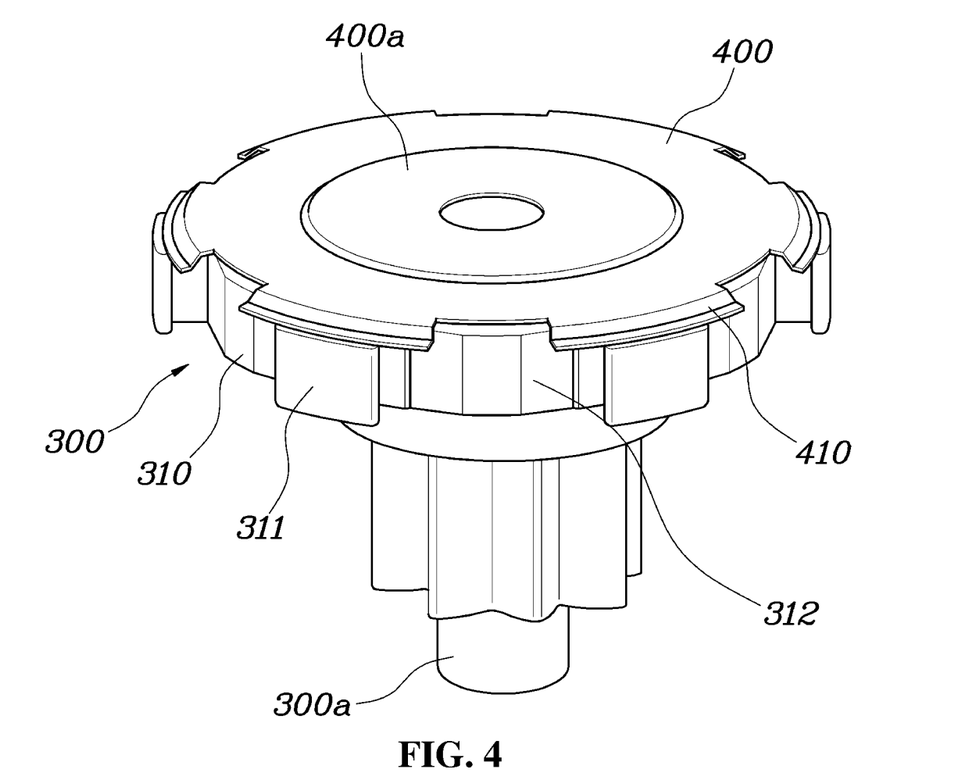
Figure 5:
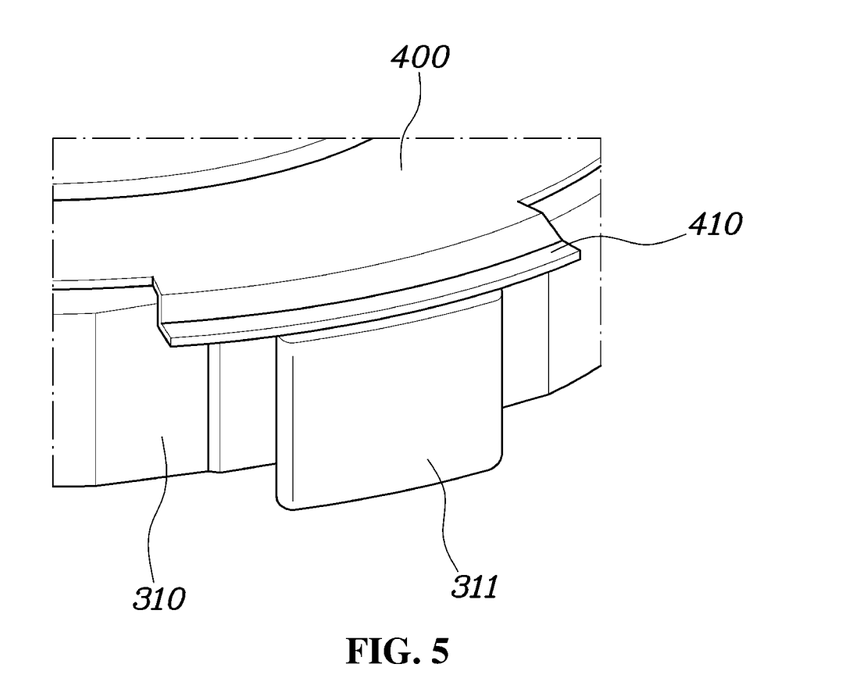
Figure 6:
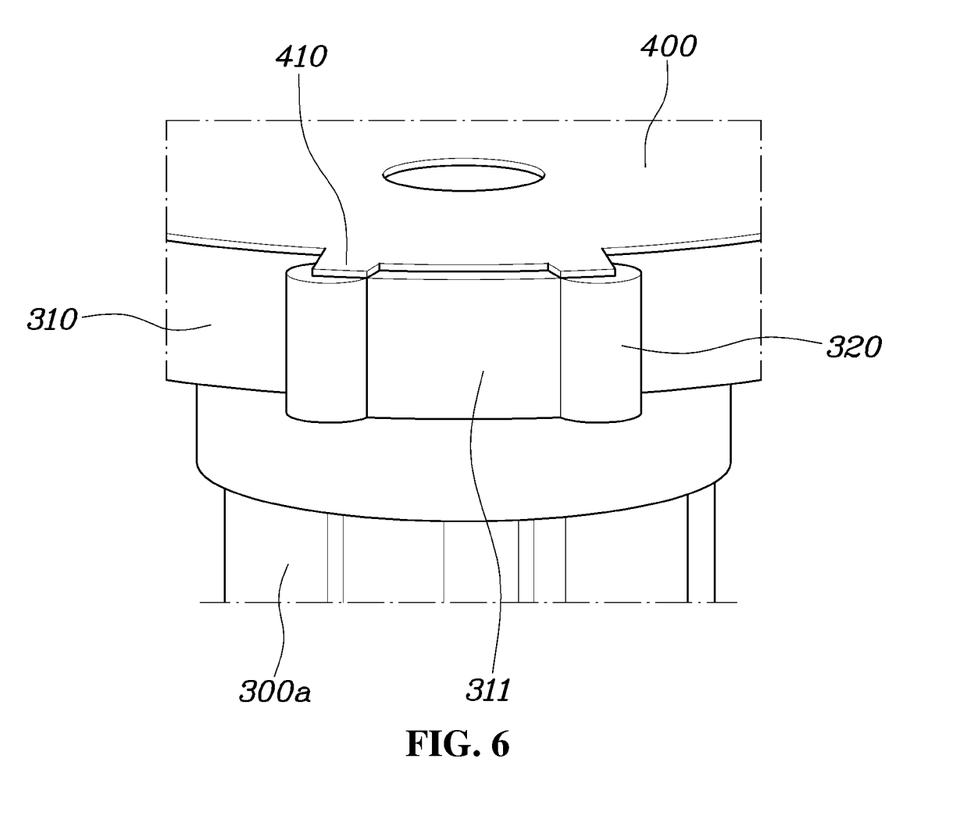

Further, as shown in FIGS. 4 to 6, a plurality of support protrusions 410 may be provided on an external circumference of the cam supporter 400, the support protrusions 410 corresponding to the plurality of brake rollers 320 seated on the brake drum 310. As described above, while the support protrusions 410 are provided on the cam supporter 400 and the cam supporter 400 is interposed between the clutch cam 210 and the brake drum 310, the support protrusions 410 correspond to the brake rollers 320, thereby restricting axial movements of the brake rollers 320 to prevent the brake rollers 320 from being tilted.

That is, as shown in FIG. 5, the support protrusions 410 of the cam supporter 400 are respectively arranged at sides of the brake rollers 320. Therefore, when the brake rollers 320 rotate, the brake rollers 320 are guided to be moved in a rotational direction by the support protrusions 410 of the cam supporter 400, so that fitted movements of the brake rollers due to operational optimization are precisely performed and operating force is increased.

The support protrusions 410 of the cam supporter 400 may be bent toward the supporting protrusions 311 and surround the supporting protrusions 311. In addition, the support protrusions 410 may have shapes corresponding to figures of the supporting protrusions 311 respectively arranged between the brake rollers 320. Whereby, as the support protrusions 410 are connected to the supporting protrusions 311 of the brake drum 310, the cam supporter 400 and the brake drum 310 may rotate together and the support protrusions 410 may be maintained in a corresponding state to the brake rollers 320.

As described above, the cam supporter 400 guides the movements of the brake rollers 320, thus securing operating performance based on precise movements of the brake rollers 320.

Meanwhile, the cam supporter 400 of the present disclosure will be applied in various embodiments.

Figure 7:
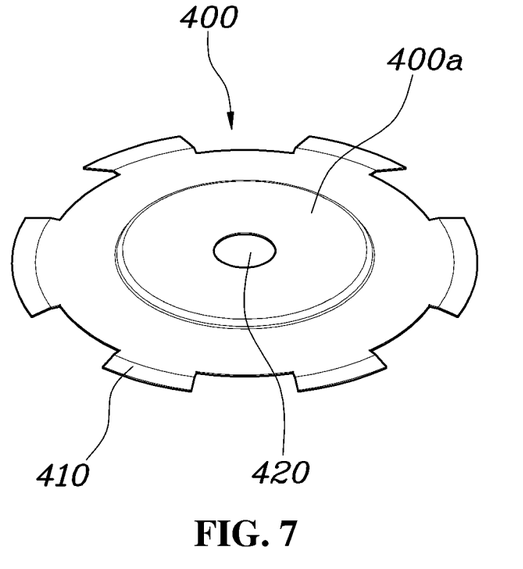
FIGS. 7 to 11 are views showing various embodiments of a cam supporter according to the present disclosure.

As an embodiment, as shown in FIG. 7, the cam supporter 400 has a central axis which is concentric with a rotational shaft of the clutch cam 210, and has a central portion 400a protruding toward the clutch cam 210. As described above, as the cam supporter 400 has a shape in which the central portion 400a protrudes toward the clutch cam 210 at the first side thereof, the protruding central portion 400a is brought into face the clutch cam 210. Further, as the second side of the cam supporter 400 is supported by the brake drum 310 of the brake device 300, when the output shaft 300a rotates eccentrically, the cam supporter 400 may restrict the axial movement of the clutch cam 210. As described above, as the central portion 400a of the cam supporter 400 protrudes toward the clutch cam 210, the clutch cam 210 is restricted from being axially tilted.

Figure 8:
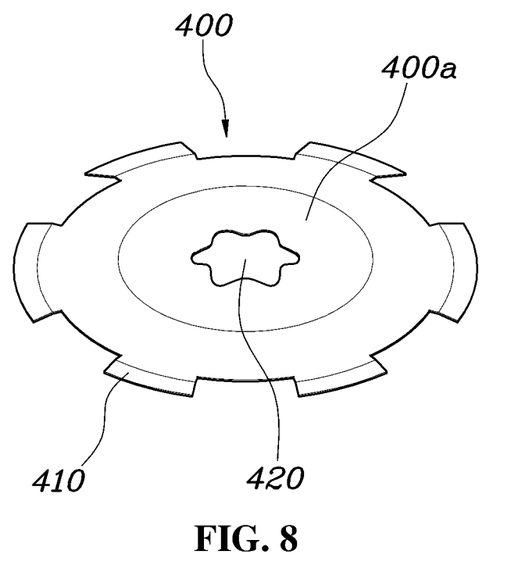

In addition, as shown in FIGS. 7 and 8, the cam supporter 400 has a through hole 420 that is open in an axial direction thereof at the center of the central portion 400a. Thus, a remaining portion of the central portion excluding the through hole 420 may have a shape protruding toward the clutch cam 210.

As the cam supporter 400 has the through hole 420 at the central portion 400a, the weight of the cam supporter 400 is reduced and the central portion 400a of the cam supporter 400 is transformed, thereby preventing movement of the clutch cam 210 and generation of excessive applied pressure.

Figure 9:
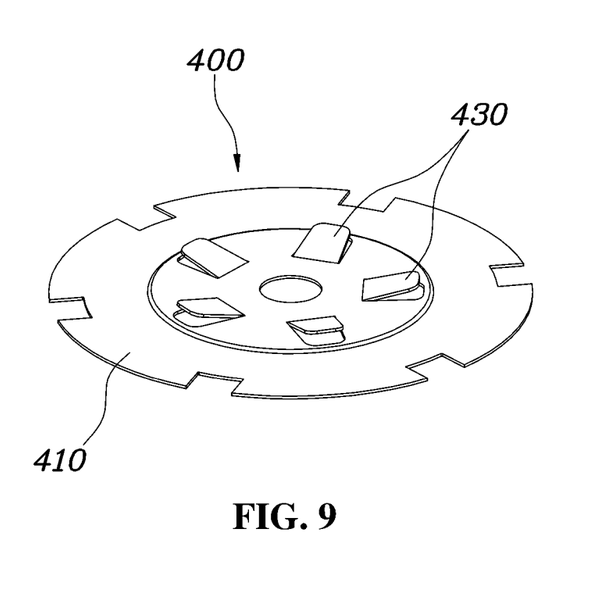

Meanwhile, as shown in FIG. 9, the cam supporter 400 may have a plurality of protrusions 430 at the central portion 400a. The protrusions 430 are arranged to be spaced apart from each other in a circumferential direction of the central portion around the center thereof, and cut out and protrude toward the clutch cam 210.

As described above, as the protrusions 430 are cut out from the central portion 400a of the cam supporter 400 and bent toward the clutch cam 210, the protrusions 430 may be configured to pressure the clutch cam 210 by a shape-restoring force of the protrusions 430. Further, without processing of protruding the central portion 400a of the cam supporter 400, the protrusions 430 may be cut out to restrict movement of the clutch cam 210.

Figure 10:
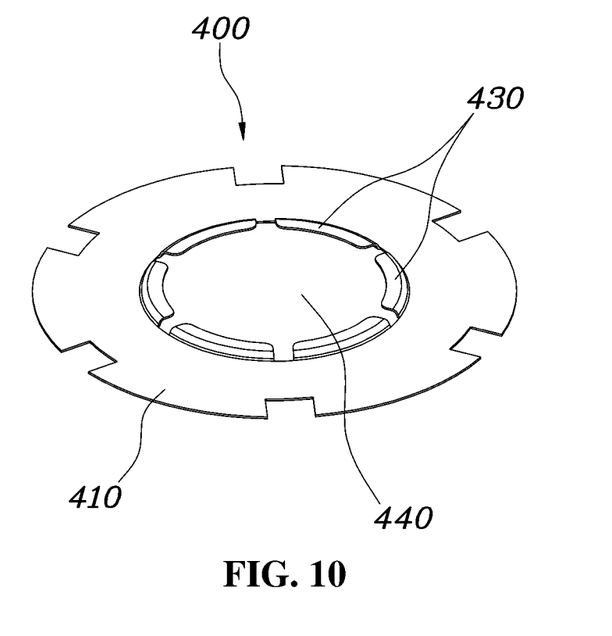
Figure 11:
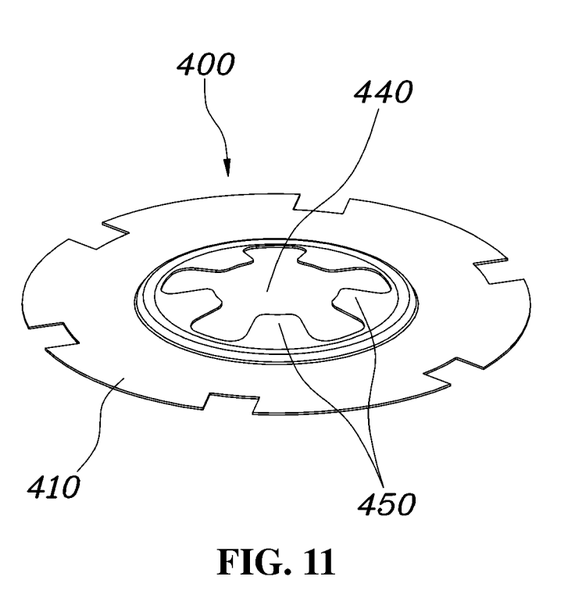

Meanwhile, as shown in FIGS. 10 and 11, the cam supporter 400 may have an open hole 440 at the central portion 400a, the open hole 440 that is open with a diameter smaller than or equal to a diameter of the clutch cam 210. The open hole 440 may have contact portions 450 extending in a radial inward direction thereof and bent toward the clutch cam 210. As described above, as the central portion 400a of the cam supporter 400 is open with the diameter of the clutch cam 210, the weight of the cam supporter 400 is reduced. Further, as the contact portions 450 positioned at the open hole 440 are bent and extend toward the clutch cam 210, the cam supporter 400 may pressure the clutch cam 210, so that the movement of the clutch cam 210 is restricted.

The above-described cam supporter 400 may be applied by selecting the various embodiments under necessary rigidity and required specifications of components.

As described above, the pumping device for a seat of a vehicle is configured such that the cam supporter 400 supports the clutch cam 210 to be balanced in the pumping device, thereby minimizing the movement of the clutch cam 210 due to an external force reversely input through the output shaft. In addition, the cam supporter 400 guides the movements of the brake rollers 320, thereby causing braking operation of the brake rollers 320 to be precisely performed and improving operating performance.

Although the preferred embodiments of the present disclosure has been described for illustrative purposes, those skilled in the art will appreciate that various modifications, additions and substitutions are possible, without departing from the scope and spirit of the invention as disclosed in the accompanying claims.

What is claimed is:

1. A pumping device for a seat of a vehicle, the pumping device comprising:
    a lever bracket configured to rotate by an external operating force;
    a clutch device including a clutch cam coupled to the lever bracket rotating with the clutch cam;
    a brake device configured to rotate in conjunction with the clutch device, coupled with an output shaft, wherein the brake device is configured to rotate by a rotational force input through the clutch device, but not rotate by a rotational force input through the output shaft; and
    a cam supporter disposed between the clutch device and the brake device, wherein, when the output shaft rotates eccentrically, the cam supporter is brought into contact with the clutch cam to restrict movement of the clutch cam,
    wherein the brake device comprises:
    a brake drum integrally coupled with the output shaft and having a plurality of supporting protrusions that protrude along an outer circumferential surface thereof; and
    a plurality of brake rollers that are respectively arranged at sides of each of the plurality of supporting protrusions, thus forming an arrangement in which the brake rollers are spaced apart from each other between the plurality of supporting protrusions adjacent to each other.

2. The pumping device of claim 1, wherein the cam supporter includes a plurality of support protrusions disposed on an outer circumference thereof, and the plurality of brake rollers are seated on the brake drum, and wherein the plurality of support protrusions of the cam supporter corresponds to the plurality of brake rollers that are seated on the brake drum.

3. The pumping device of claim 2, wherein the support protrusions of the cam supporter are bent toward and surround the supporting protrusions of the brake drum, and the support protrusions have shapes corresponding to figures of the supporting protrusions that are respectively arranged between the brake rollers.

4. The pumping device of claim 1, wherein the cam supporter has a central axis that is concentric with a rotational shaft of the clutch cam, and has a central portion protruding toward the clutch cam.

5. The pumping device of claim 4, wherein the cam supporter has a through hole at a center of the central portion, the through hole being open in an axial direction of the cam supporter, so that a remaining portion of the central portion excluding the through hole has a shape protruding toward the clutch cam.

6. The pumping device of claim 4, wherein, at the central portion of the cam supporter, the cam supporter has a plurality of protrusions that are arranged to be spaced apart from each other in a circumferential direction of the central portion around the center thereof and cut and protrude toward the clutch cam.

7. The pumping device of claim 1, wherein the clutch cam is coupled to the lever bracket, thus rotating together with the lever bracket, and has a plurality of wedge protrusions at an outer circumferential surface thereof, and
    wherein the clutch device further comprises:
    clutch rollers disposed on the outer circumferential surface of the clutch cam and respectively arranged at both sides of each of the plurality of wedge protrusions;
    a clutch spring connected to the clutch rollers arranged between the wedge protrusions adjacent to each other so as to elastically support the clutch rollers in a circumferential direction of the clutch cam; and
    a clutch drum provided with the clutch rollers and the clutch spring at an inner circumferential surface thereof, and having an insert protrusion that extends toward the brake drum in an axial direction of the clutch cam and is inserted between the brake rollers arranged between the supporting protrusions adjacent to each other.

8. The pumping device of claim 1, wherein the cam supporter has a first side facing the clutch cam and a second side supported by the brake device.

9. A pumping device for a seat of a vehicle, the pumping device comprising:
    a lever bracket configured to rotate by an external operating force;
    a clutch device including a clutch cam coupled to the lever bracket rotating with the clutch cam;
    a brake device configured to rotate in conjunction with the clutch device, coupled with an output shaft, wherein the brake device is configured to rotate by a rotational force input through the clutch device, but not rotate by a rotational force input through the output shaft; and
    a cam supporter disposed between the clutch device and the brake device, wherein, when the output shaft rotates eccentrically, the cam supporter is brought into contact with the clutch cam to restrict movement of the clutch cam,
    wherein, at a central portion of the cam supporter, the cam supporter has an open hole that is open with a diameter smaller than or equal to a diameter of the clutch cam, and the open hole has a contact portion extending in a radial inward direction thereof and being bent toward the clutch cam.

* * * * *